Oct. 11, 1949.   H. T. EBERHART   2,484,276
LAWN EDGER
Filed April 12, 1948
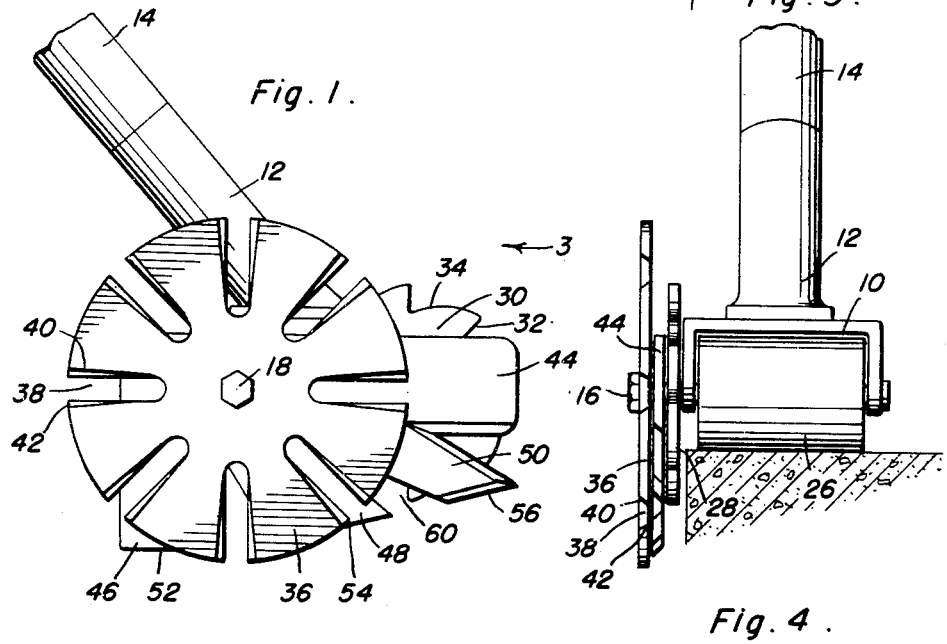
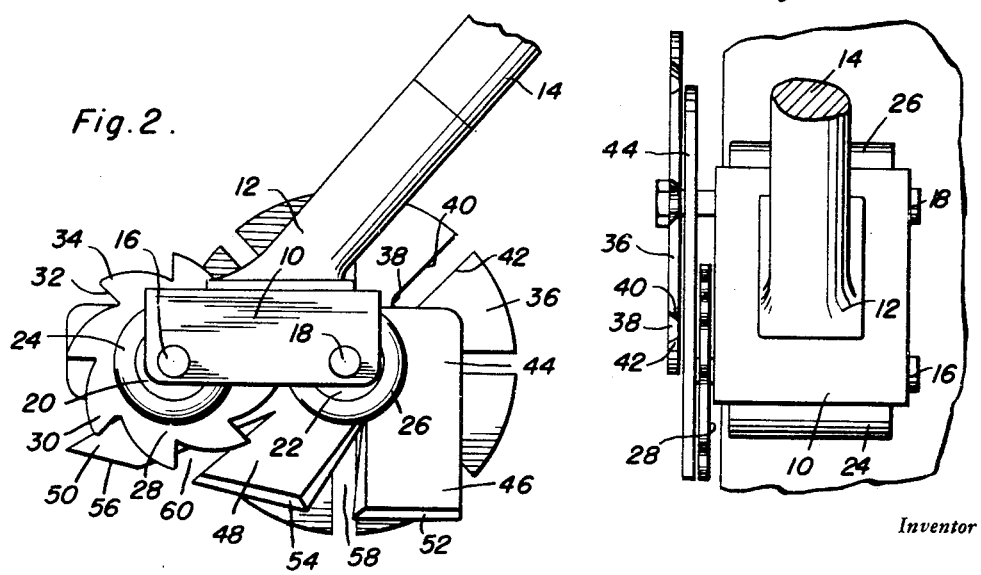
Inventor
Henry T. Eberhart
By *Clarence A. O'Brien and Harvey B. Jacobson*
Attorneys Patented Oct. 11, 1949

2,484,276

UNITED STATES PATENT OFFICE 2,484,276

LAWN EDGER

Henry T. Eberhart, Long Beach, Calif.

Application April 12, 1948, Serial No. 20,408

6 Claims. (Cl. 56—256)

This invention relates to new and useful improvements in lawn edgers and the primary object of the present invention is to provide a lawn edger including a plurality of cooperative cutting elements so arranged as to effectively and efficiently trim the grass adjacent the edges of sidewalks and the like.

Another important object of the present invention is to provide a lawn edge trimmer including a fixed cutting blade, a pair of cutting members disposed on opposite sides of the fixed cutting blade, and novel and improved means for rotating the cutting members and for spacing the cutting edges of the cutting members at a predetermined distance below the surface of a sidewalk.

A further object of the present invention is to provide a lawn edger that is extremely small and compact in structure and which is conveniently manipulated to quickly and readily trim the edges of a lawn adjacent the walk thereof.

A still further aim of the present invention is to provide a lawn edge trimmer that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of the present lawn edger, and with parts of the handle portion thereof broken away and shown in section;

Figure 2 is a side elevational view of the present lawn edger taken in an opposite direction from that shown in Figure 1;

Figure 3 is an end view of the present lawn edge trimmer taken substantially in the direction of arrow numbered 3 in Figure 1; and Figure 4 is a top plan view of the lawn edger constructed in accordance with the present invention taken susbtantially in the direction of arrow numbered 4 in Figure 3.

Referring now to the drawings in detail, wherein for the purpose of illustration, there is disclosed a preferred embodiment of the present invention, the numeral 10 represents an inverted substantially channel shaped support, the web portion of which is rigidly secured in any suitable manner to one end 12 of a suitable handle 14 the longitudinal axis of which is disposed at an inclined angle relative to the longitudinal axis of the support 10.

Rotatably carried by the support 10 is a pair of shafts 16 and 18 that are spaced parallel to each other. Keyed or otherwise suitably fixed such as by set screws or the like to the shafts 16 and 18, is a forward and leading roller 20 and a rear or trailing roller 22, each of which is provided with substantially cylindrical, bearing surfaces 24 and 26 of resilient preferably rubberized material.

Fixed in any suitable manner to the shaft 16, preferably by the use of set screws, is a leading cutter member 28 having a plurality of circumferentially spaced arcuate cutting plates 30 integrally formed with the member 28 which include substantially triangular cutting edges 32 and 34.

Secured to the shaft 18, in any suitable manner, is an annular trailing cutter or main cutting plate 36 having a plurality of radial, substantially rectangular slots or cutouts 38 the side or longitudinal edges 40 and 42 of which are beveled. It should be noted, that the lower surface of the main cutter 36 terminates in a plane spaced below and parallel to the lower extremity of the leading cutter 28.

Mounted on the shafts 16 and 18, is a longitudinal, fixed cutting blade 44 that is interposed between the leading cutting member 28 and the main cutting plate 36. The cutting blade 44 includes a plurality of spaced, flat portions 46, 48 and 50 the lower beveled edges 52, 54 and 56 of which are disposed in an arcuate upwardly and forwardly inclined plane. These flat portions 46, 48 and 50 are spaced by substantially triangular notches 58 and 60 the edges of which are beveled.

In practical use of the present invention, the blades or cutters 28 and 36 rotate and the blade 44 remains fixed against rotation. The blades 28, 36 and 44 cooperate to cut or trim the edge of a lawn adjacent a sidewalk and assure a positive and desirable cutting of the grass due to the double action of the blades 28 and 36 and the cutting edges thereof.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A lawn edger comprising a handle, a support bracket at one end of said handle, a pair of parallel shafts journaled for rotation on said bracket, first and second rollers of similar diameters fixed on said shafts, a fixed cutter mounted on both of said shafts and having inner and outer faces, an auxiliary vertically rotating disk-type cutter secured to one of said shafts and spaced between the bracket and the inner face of said fixed cutter, and a main vertically rotating disk-type cutter secured to the other shaft and spaced from the outer face of said fixed cutter.

2. The combination of claim 1 wherein said main cutter includes a forward portion and said auxiliary cutter includes a rear portion, the forward portion of said main cutter overlapping the rear portion of said auxiliary cutter.

3. A lawn edger comprising an inverted channel member having a web portion and first and second leg portions, an elongated handle having one end fixed to the web portion of said channel member, forward and rear spaced parallel shafts journaled for rotation on the leg portions of said channel member, each of said shafts having an end portion projecting outwardly from the first leg portion of said channel member, a forward roller fixed on said forward shaft and a rear roller fixed on said rear shaft, said rollers being disposed between the first and second leg portions of said channel member, a vertically disposed fixed cutter mounted on the outwardly projecting end portions of said forward and rear shafts, said fixed cutter having an inner face and an outer face, a main vertically disposed disk-type cutter secured to the rear shaft and spaced outwardly from the outer face of said fixed cutter, and a vertically rotatable auxiliary cutter secured to the outer end portion of said forward shaft and disposed between the inner face of said fixed cutter and the first leg portion of said channel member.

4. The combination of claim 3 wherein said main cutter is provided with a plurality of circumferentially spaced radially disposed substantially rectangular slots, the longitudinal edges defining said slots being beveled.

5. In a lawn edge trimmer including a wheeled frame having forward and rear spaced parallel rollers and horizontally disposed supporting shafts for the rollers, a fixed cutter supported solely by said supporting shafts and disposed perpendicular to said supporting shafts, a first vertically rotatable disk-type cutter mounted on one of said shafts for rotation therewith, and a second vertically rotatable disk-type cutter mounted on the other supporting shafts for rotation therewith, said fixed cutter having inner and outer vertical faces and said first and second cutters also having inner and outer vertical faces, the outer vertical face of said first cutter being spaced inwardly from the inner vertical face of said fixed cutter, and the inner vertical face of said second cutter being spaced outwardly from the outer vertical face of said fixed cutter.

6. The combination of claim 5 wherein the distance between said supporting shafts is less than the summation of the radii of said first and second cutters.

HENRY T. EBERHART.

REFERENCES CITED

The following references are of record in the file of this patent:

UNITED STATES PATENTS

| Number | Name | Date |
| --- | --- | --- |
| 1,185,093 | Healy | May 10, 1916 |
| 1,489,868 | Wahl | Apr. 8, 1924 |
| 1,970,827 | Van Kesteren | Aug. 21, 1934 |
| 2,051,988 | Eckley | Aug. 25, 1936 |
| 2,212,057 | Waller | Aug. 20, 1940 |

FOREIGN PATENTS

| Number | Country | Date |
| --- | --- | --- |
| 354,311 | Great Britain | Aug. 4, 1931 |